United States Patent [19]

Watanabe et al.

[11] Patent Number: 4,748,363

[45] Date of Patent: May 31, 1988

[54] CURRENT-COLLECTING BRUSH APPARATUS

[75] Inventors: Takashi Watanabe, Hitachi; Masao Ohi, Mito; Koji Tanaka, Hatachi; Yoshio Takikawa, Hitachi; Yasuto Kondoh, Hitachi; Satoshi Oouchi, Hitachi, all of Japan

[73] Assignees: Hitachi, Ltd.; Hitachi Service Eng., Co. Ltd., both of Tokyo, Japan

[21] Appl. No.: 17,534

[22] Filed: Feb. 24, 1987

[30] Foreign Application Priority Data

Feb. 21, 1986 [JP] Japan .................................. 61-35304

[51] Int. Cl.[4] .............................................. H02K 13/00

[52] U.S. Cl. .................................... 310/249; 310/220; 310/239

[58] Field of Search ................. 310/220, 71, 221, 222, 310/239, 242, 245, 247, 248, 249, 232, 219, 233; 318/541

[56] References Cited

U.S. PATENT DOCUMENTS

| | | | |
|---|---|---|---|
| 837,889 | 12/1906 | Seyfert | 310/220 |
| 1,038,861 | 9/1912 | Doinikoff | 310/220 |
| 2,618,768 | 11/1952 | Vickers | 310/222 |
| 3,577,025 | 5/1971 | Kingsbury | 310/239 |
| 4,337,407 | 6/1982 | Hummert | 310/220 |

FOREIGN PATENT DOCUMENTS

| | | | |
|---|---|---|---|
| 0890540 | 9/1953 | Fed. Rep. of Germany | 310/220 |
| 0147818 | 10/1921 | United Kingdom | 310/220 |
| 0464679 | 4/1937 | United Kingdom | 310/248 |
| 1011148 | 7/1964 | United Kingdom | 310/220 |

*Primary Examiner*—R. Skudy

*Attorney, Agent, or Firm*—Antonelli, Terry & Wands

[57] ABSTRACT

A current-collecting brush apparatus is disclosed in which brushes are held slidably on a brush holder and pressed against a rotor by a brush-pressing spring. Pigtails connected to supply current to the brushes comprise a plurality of spiral conductors in parallel which are connected by being coiled in mutual opposite directions to offset the magnetic fluxes generated therein.

6 Claims, 3 Drawing Sheets

CURRENT-COLLECTING BRUSH APPARATUS

BACKGROUND OF THE INVENTION

The present invention relates to a current-collecting brush apparatus used for rotary electric equipment such as a dynamo and a motor.

A current-collecting brush apparatus comprises a brush in sliding contact wiht the slip ring or the like part or a rotary electric machine traditionally referred to as a rotor and a pigtail for supplying power to the brush, and is generally installed by being mounted on a brush-holding case. Such a collecting brush apparatus comprises a pigtail including a plurality of strands installed of flexible electrical conductors as disclosed in U.S. Pat. No. 3,577,025. Explanation will be made with reference to the attached drawing about the manner in which a collecting brush apparatus is mounted.

A perspective view of a conventional current-collecting brush apparatus and a holding construction thereof is shown in FIG. 1. In FIG. 1, reference numeral 1 designates a brush, numeral 2 a pigtail with an end secured to the brush, and numeral 3 a brush-holding case for slidably holding the brush 1. The brush-holding case 3 includes a groove 3*a*. Numeral 4 desigantes a support pillar mounted and locked in the groove 3*a*, which pillar has a connector 4*a* for connecting the other end of the pigtail 2 and a brush-supporting arm 4*b* slidably engaging the brush to guide the brush while placing the brush in position. Numeral 5 designates a U-shaped spring for releasing the lock securing the support pillar 4, and numeral 6 a constant-pressure spring of roll-up type mounted at the lower end of the support pillar 4. The constant pressure spring 6 keeps the upper end of the brush 1 pressed downward thereby to hold the lower side of the brush in contact with the slip ring or rotor 9. Numeral 7 designates a transparent partition plate, numeral 8 an insulating handle for fixing the plate 7, and numeral 10 a bus ring or non-rotating conductor securely bolted to the brush holding case 3 for electrical connection with the pigtail.

The brush 1 is mounted in the manner described below. Specifically, when the brush 1 is not mounted, the constant-pressure spring 6 is located at the lower end of the support pillar 4 in spirally coiled form. The brush 1 is inserted from under the brush-holding case 3, and is mounted by being pushed up while extending the constant-pressure spring 6 against the spring force thereof.

Generally, during the operation of a collecting brush apparatus described above, axial vibrations of the rotary electric machine or the wear or rough surface of the slip ring, etc. causes a spring or bounce of the brush and momentary separation between the brush and the slip ring, unavoidably resulting in a spark generated therebetween. This spark is a source of various adverse effects.

SUMMARY OF THE INVENTION

The object of the present invention is to provide a current collecting brush apparatus which obviates the above-mentioned problems of the prior art and is capable of containing a spark.

In order to achieve the above-mentioned object, there is provided according to the present invention a current collecting brush apparatus wherein a brush is connected in parallel to a plurality of pigtails a predetermined number of which are wound in one direction and as many pigtails are wound in reverse direction so that magnetic fluxes generated by the pigtails offset each other. As a result, the whole inductance of the pigtails is reduced thereby to reduce the electromagnetic energy stored thus dampening the generation of a spark.

DESCRIPTION OF THE PREFERRED EMBODIMENTS

Figure 1:
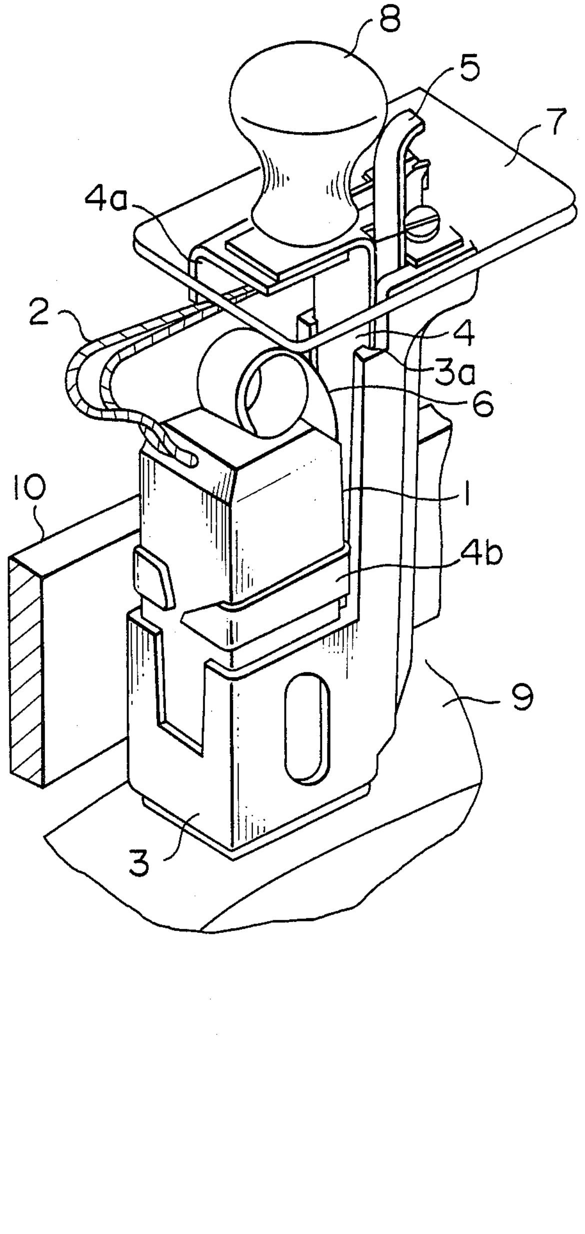
FIG. 1 PRIOR ART
FIG. 1 is a perspective view showing a construction of a prior art current-collecting brush apparatus.

The present invention will be explained below with reference to the embodiments shown in the drawings.

Figure 3:
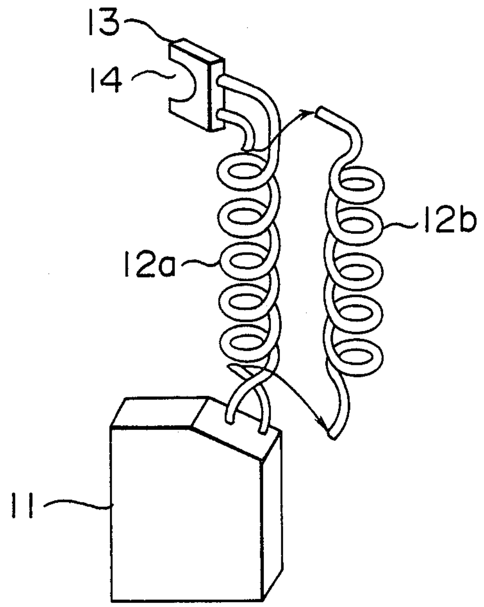
FIG. 3 is a perspective view of a current-collecting brush according to an embodiment of the present invention.

A perspective view of a current-collecting brush according to an embodiment of the present invention is shown in FIG. 3. In FIG. 3, reference numeral 11 designates a brush. A multiplicity of brushes are arranged fixedly around the rotor. Numerals 12*a*, 12*b* designate pigtails with an end secured to the brush 1, numeral 13 a terminal having the other end of the pigtails 12*a*, 12*b* shown to be in the form of a pair of spiral conductors connected in parallel and fixedly secured thereto, and numeral 14 a connecting terminal on the terminal 13 for connection with a connector 4*a* of a support pillar 4 shown in FIG. 1. The pigtail 12*a* is formed in a clockwise spiral coil, and the pigtail 12*b* in a counterclockwise spiral coil.

The inventors discovered while studying the spark generated between the slip ring, etc. and the brush that the pigtails of the collecting brush are greatly involved in the spark.

Specifically, the pigtails have a considerable length to meet the requirements for mounting on the brush holding case 3 from thereunder and the wear of the brush in operation. With the brush mounted on the brush-holding case, therefore, the pigtails are in a lengthy loose form. The pigtails thus have a considerable inductance, and the electromagnetic energy stored in the inductance is discharged the moment the brush comes off from the slip ring or the like, thereby increasing the spark generated.

Figure 2:
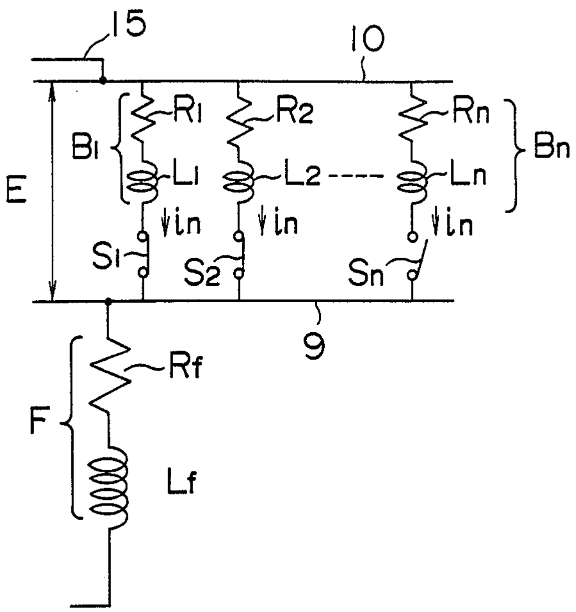
FIG. 2 PRIOR ART
FIG. 2 is a diagram showing an equivalent circuit relating to a prior art for explaining the generation of a spark.

FIG. 2 is a diagram showing an equivalent circuit for explaining a mechanism by which a spark is generated by the inductance of the pigtails. In FIG. 2, numerals 9 and 10 designate a slip ring and a bus ring similar to those designated by like numerals in FIG. 1, and numeral 15 a lead wire for connecting a power supply and the bus ring 10. Reference characters $B_1$ to $B_n$ designate a plurality of current collecting brushes including pigtails and brush units, characters $R_1$ to $R_n$ resistors therefor, $L_1$ to $L_n$ inductances thereof, and characters $i_1$ to $i_n$currents flowing in the collecting brush units $B_1$ to $B_n$respectively. Character F designates a field coil of a rotary electric machine, character $R_f$a resistor therefor, and character $L_f$an inductance thereof. Characters $S_1$ to $S_n$ designate switches for indicating the contacting and separation between the brush 1 and the slip ring 9 of the collecting brush units $B_1$ to $B_n$. Assuming that E is the voltage applied to a brush, $E_a$ the spark-generating voltage, R the pigtail resistance, L the pigtail inductance, i the pigtail current, W the arc energy, and $T_a$ the arc duration, while ignoring the resistance and inductance of the brushes themselves. Under the condition where a spark is generated, the equations described below are established.

$$E = Ri + L\frac{di}{dt} + E_a \quad (1)$$

$$W = \int_0^{T_a} E_a \cdot i dt \quad (2)$$

Assuming $I_0$ to be E/R and n to be $E_a$/E, the equation (1) is substituted into the equation (2). Then, $$W = nLI_0^2\left\{1 - (n-1)\, l_n \frac{n}{n-1}\right\} \quad (3)$$

As seen from the equation (3), the magnitude of the arc energy W is proportional to the magnitude of the inductance of the pigtails. It is therefore possible to dampen the spark by reducing the inductance of the pigtails.

In the embodiment shown in FIG. 3, the pigtails 12a and 12b are formed in oppositely spiralled coils in mutually alternate turns, so that the inductance thereof is very small thereby to reduce the spark generation effectively. The pigtails that are otherwise loose as in the prior art are extendable in spirally coiled form, with the result that the looseness of the entire pigtails is eliminated without lengthening the same as compared with the conventional pigtails.

Figure 4:
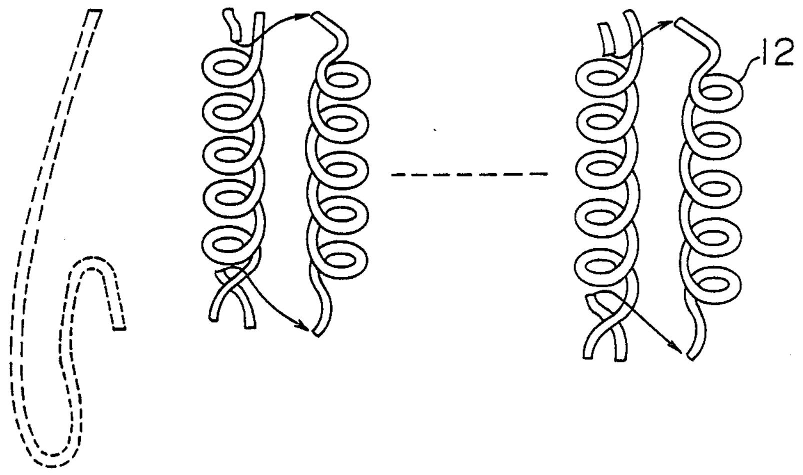
FIGS. 4 and 5 are diagrams showing current-collecting brushes according to other embodiments of the present invention.
Figure 5:
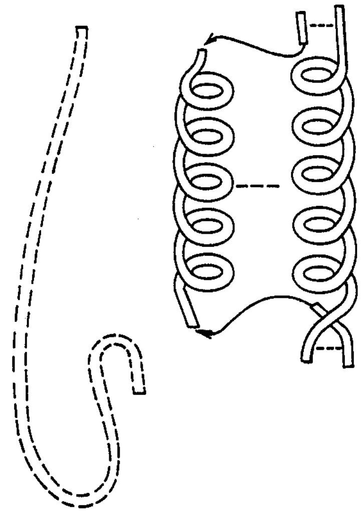

The foregoing description is made with reference to a case using two pigtails. Alternately, three or more pigtails may be used. In this case, if an even number of pigtails are involved, they may be coupled in a plurality of pairs of oppositely spiralled coils in the manner shown at 12 in FIG. 4, or groups of oppositely spiralled pigtails each including the same number of pigtails may be combined in one whole coil form in the manner shown in FIG. 5. If an odd number of pigtails are used, on the other hand, one of the pigtails is left as in the conventional manner as indicated by dotted lines in FIGS. 4 and 5 and the remaining pigtails are divided into groups each including the same number of opposedly spiralled pigtails into a coil form. In the latter case, the current flowing in the one separate pigtail left in the conventional manner is equivalent to only one of the divisions of all the pigtails, and therefore the inductance thereof is sufficiently small.

Even in the case where there are a plurality of pigtails not grouped in oppositely spiralled coils, the advantages of the present invention are maintained to the extent that the pigtails are formed in oppositely spiralled coils.

We claim:

1. A current-collecting brush apparatus comprising a plurality of brushes pressed against a rotor, a brush holder for slidably holding each of said brushes, a brush-pressing spring for pressuring each of said brushes into contact with said rotor, a plurality of pigtails connected to each of said brushes for applying current to and receiving current from each of said brushes, and a bus ring for applying current to and receiving current from the pigtails, wherein said pigtails include at least a pair of spiral conductors connected in parallel and arranged coiled in opposite directions in a manner to offset the magnetic fluxes generated therein.

2. A current-collecting brush apparatus according to claim 1, wherein each of said pigtails includes an even number of parallelly-connected spiral conductors, one half of which are coiled in the direction opposite to the other half in a manner to offset the magnetic fluxes generated therein respectively.

3. A current collecting brush apparatus according to claim 1, wherein each of said pigtails includes an odd number of conductors, of which one half are spirally coiled in the direction opposite to the other half in a manner to offset the magnetic fluxes generated therein, except one of said odd number of conductors.

4. A current collecting brush apparatus having spark suppression properties comprising a plurality of brushes pressed against a slip ring on a rotor, a brush holder for slidably holding each brush, a brush-pressing spring for pressuring each of said brushes into contact with said slip ring, a plurality of pigtails connected to each brush for applying current to and receiving current from the brushes, a conductor for applying current to and receiving current from said plurality of pigtails, and means for reducing spark generation due to the spring of the brush causing separation of the brush and slip ring including at least a pair of spiral conductors connected in parallel to each brush and arranged coiled in opposite directions in a manner to offset the magnetic fluxes generated therein.

5. A current-collecting brush apparatus according to claim 4, wherein each of said pigtails includes an even number of parallelly-connected spiral conductors, one half of which are coiled in the direction opposite to the other half in the manner to offset the magnetic fluxes generated therein respectively.

6. A current collecting brush apparatus according to claim 4, wherein each of said pigtails includes an odd number of conductors, of which one half are spirally coiled in the direction opposite to the other half in a manner to offset the magnetic fluxes generated therein, except one of said odd number of conductors.

* * * * *